United States Patent

[11] 3,560,665

| [72] | Inventors | Laurence Howard Pountney<br>Allestree;<br>Clifford R. Amsbury, King's Newton,<br>England |
|---|---|---|
| [21] | Appl. No. | 764,692 |
| [22] | Filed | Oct. 3, 1968 |
| [45] | Patented | Feb. 2, 1971 |
| [73] | Assignee | Rolls-Royce Limited<br>Derby, England<br>a British Company |
| [32] | Priority | Oct. 7, 1967 |
| [33] | | Great Britain |
| [31] | | 45982/67 |

[54] WORK STUDY RECORDING SYSTEM
8 Claims, 2 Drawing Figs.

[52] U.S. Cl. ................................................. 179/100.2,
340/174.1
[51] Int. Cl. ........................................................ G11b 27/32,
G11b 31/00
[50] Field of Search ........................................... 179/6.1,
100.1DR, 100.2, B, MI, S; 340/174.1A; 35/35

[56] References Cited
UNITED STATES PATENTS

| 2,982,923 | 5/1961 | Hibbard | 179/100.2 |
| 3,075,050 | 1/1963 | Lorenz | 179/100.2 |
| 3,291,919 | 12/1966 | Robitaille | 179/100.2 |

*Primary Examiner*—Bernard Konick
*Assistant Examiner*—Robert S. Tupper
*Attorney*—Cushman, Darby & Cushman ABSTRACT: A work study recording system is described for analyzing a worker's performance of a production process or the like, consisting of a number of operations. The recording system includes an electrical information generating circuit connected to a recording means and a replay circuit also connected to the recording means for converting the recorded information into useable information. The electrical information generating circuit includes a transducer for converting spoken information into an electrical signal to be recorded, a means for generating electrical timing signals corresponding to the commencement and termination of each of the operations in the process which are recorded on the recording means and a manually operable means for recording further coded information on the recording means. The replay circuit receives the recorded signals from the recording means and measures the intervals between successive timing signals and it includes a printing device connected to receive signals from the replay circuit for printing the duration of each interval and the further coded information.

WORK STUDY RECORDING SYSTEM

This invention relates to work study recording systems.

When a new repetitive production process or other job is first introduced in a factory, it is often desirable to establish an average (or "standard") time taken by an operator to perform the process so that, for example, production costs and rates of pay may be calculated. A work study engineer therefore watches the operator performing the process, which usually comprises a number of individual operations, and simultaneously measures the duration of each operation, assess by experience the rate at which the operator is working during each operation and gives a commentary on the precess into a tape recorder or other suitable recording instrument. If the process consists of a large number of short operations, the task of the work study engineer becomes extremely difficult. It is an object of the present invention, therefore, to provide a work study recording system which is more convenient to operate.

According to the present invention, a work study recording system, for use in the analysis of an operator's performance of a production process or other job consisting of a number of operations, includes an electrical recording circuit adapted to be connected to recording equipment, said recording circuit comprising means whereby spoken information may be recorded, means whereby timing signals corresponding to the commencement and termination of each operation may be recorded and manually operable means whereby further coded information may be recorded.

Preferably the work study recording system also includes a replay circuit adapted to receive recorded signals from the recording equipment and to measure the intervals between successive timing signals, and a printing device connected to receive signals from the replay circuit and adapted to print the duration of each interval and the further coded information.

In a preferred embodiment of the invention, the means whereby timing signals may be recorded and the means whereby further coded information may be recorded comprise a first pulse generator, a second pulse generator and a first counter, the arrangement being such that at the commencement of each operation, pulses from the second pulse generator are permitted to modulate the pulses from the first pulse generator until a predetermined number of pulses from the first pulse generator have been counted by the first counter, said predetermined number being representative of the coded information.

Thus the leading edge of the first modulating pulse at the commencement of an operation constitutes the timing signal which indicates the commencement of that operation and the termination of the previous operation.

The first pulse generator and/or the second pulse generator preferably comprises a multivibrator circuit.

The means whereby spoken information may be recorded may comprise a microphone.

The recording equipment preferably comprises a tape recorder.

The further coded information may comprise a number representative of a rate at which the operator is working during an operation and/or a number indicative of a particular operation or process.

The replay circuit preferably comprises means for demodulating the modulated pulses in the recorded signal and a second counter adapted to count the demodulated pulses.

The means for demodulating the modulated pulses may comprise a filter adapted to transmit only those recorded signals having a frequency in the region of the frequency of the pulses from the second pulse generator, a rectifying circuit connected to receive and rectify the filtered signal from the filter and a Schmitt trigger circuit connected to receive the rectified signal from the rectifying circuit.

In a preferred embodiment of the invention, the replay circuit also comprises a clock pulse generator, a third counter connected to be driven by the clock pulse generator and having a plurality of outputs which are adapted to be cyclically energized, and a fourth counter connected to be driven by one of the outputs of the third counter and adapted to be reset to zero in response to successive timing signals.

The clock pulse generator may comprise a Wien bridge oscillator circuit.

Preferably, the cyclically energized outputs of the third counter are used to produce, in response to each timing signal, a first control signal which is operative to cause the printing device to print the totals accumulated in the second and fourth counters and a second control signal which is operative to reset the second and fourth counters.

The invention will now be particularly described, by way of nonlimitative example only, with reference to the accompanying drawings, in which.

Figure 1:
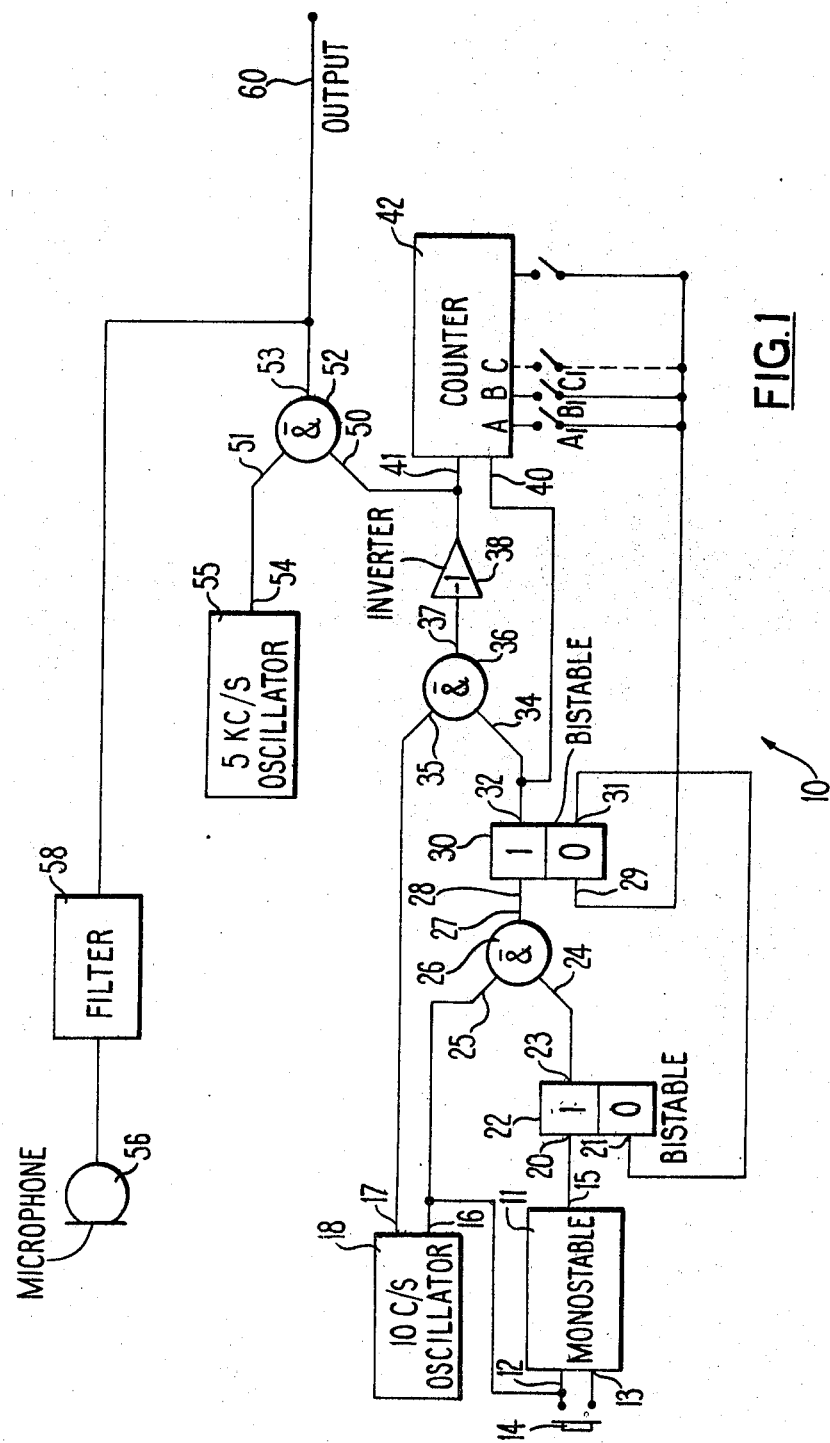
FIG. 1 is a block circuit diagram of a recording circuit for use in a work study recording system in accordance with the invention.

In FIG. 1 there is shown a recording circuit 10 comprising a monostable circuit 11 having two inputs 12, 13 arranged to be connected together by the operation of a pushbutton timing switch 14 which forms part of means whereby timing signals may be recorded. The input 12 of the monostable circuit 11 is also connected to an output 16 of a 10 c.y.s. square wave pulse generator 18, which may be a simple multivibrator circuit.

The monostable circuit 11 has an output 15 which is connected to the 1 input 20 of a bistable circuit 22. The 1 output 23 of the bistable circuit 22 is connected to one input 24 of a two-input NAND gate 26, the other input 25 of which is connected to the output 16 of the pulse generator 18.

Output 27 of the NAND gate 26 is connected to the 1 input 28 of a bistable circuit 30, the 0 output 31 of which is connected to the 0 input 21 of the bistable circuit 22. The 1 output of the bistable circuit 30 is connected to "reset" input 40 of a counter 42 and to one input 34 of a two-input NAND gate 36, the other input 35 of which is connected to an output 17 of the pulse generator 18.

Output 37 of the NAND gate 36 is connected, via an inverter 38, to an input 41 of the counter 42 and to one input 50 of a two-input NAND gate 52.

The counter 42 constitutes part of manually operable means whereby coded information may be recorded and includes a binary-to-decimal converter (not shown) and has outputs A, B, C,..., which are connected, via respective selector switches A1, B1, C1,..., to the 0 input 29 of the bistable circuit 30. As the counter 42 receives input pulses, the outputs A, B, C, ..., correspond to counts of 0, 1, 2 respectively.

The other input 51 of the NAND gate 52 is connected to an output 54 of a 5 k.c.p.s. square wave pulse generator 55, which may also be a simple multivibrator circuit, while output 53 of the NAND gate 52 is connected to an output 60 of the recording circuit 10.

A microphone 56 is also connected, via a filter 58 which prevents the transmission of signals having a frequency in the region of 5 k.c.p.s. to the output 60 of the recording circuit 10.

The output 60 of the recording circuit 10 is connected in turn to the recording input of suitable recording equipment (not shown) such as a tape recorder, wire recorder or disc recorder.

In operation, a work study engineer energizes the recording equipment and closes the switch A1 before the commencement of a process which is to be studied. In practice there may be 15 switches A1, B1, C1..., which are mechanically interlocked so that one switch and only one switch, is always closed; before the start of a process, any one of these switches may be closed, but it is more convenient always to use switch A1.

When the operator performing the process commences working, the work study engineer operates the pushbutton timing switch 14.

Operation of the switch 14 causes the monostable circuit 11, which has a time constant of about one second, to be triggered by the next subsequent negative-going voltage transition at the output 16 of the pulse generator 18. After one second a negative-going voltage transition is produced at the output 15 of the monostable 11, which transition triggers the bistable circuit 22 into its 1 state, thus opening the NAND gate 26. The next subsequent positive-going voltage transition at the output 16 of the pulse generator 18 passes through, and is inverted by, the NAND gate 26, thus triggering the bistable circuit 30 into its 1 state and consequently resetting the counter 42 to zero and opening the NAND gate 36.

The waveforms at the outputs 16 and 17 of the pulse generator 18 are indentical but 180 out of phase: one-half of a cycle of the 10 c.p.s. waveform after the NAND gate 36 is opened, therefore, a positive-going voltage pulse from the output 17 of the pulse generator 18 passes through the NAND gate 36 and the inverter 38, experiencing two inversions.

The positive-going voltage pulse from the inverter 38 enters the counter 42, causing a negative-going voltage transition at the output A, and simultaneously opens the NAND gate 52. While NAND gate 52 is open, 5 k.c.p.s. pulses from the pulse generator 55 are permitted to enter the recording equipment.

Since the switch A1 is closed, the negative-going voltage transition at the output A of the counter 42 is operative to trigger the bistable circuit 30 back into its 0 state, thus closing the NAND gate 36 and triggering the bistable circuit 22 back into its 0 state. It will therefore be seen that, when the switch A1 is closed, the first positive-going voltage pulse from the 10 c.p.s. pulse generator 18 to pass through the NAND gate 36 is cut short. However, the NAND gate 52 remains open for a sufficient length of time for at least part of a 5 k.c.p.s. pulse to be recorded.

While the operator performing the process carries out the first operation of the process, the work study engineer assesses by experience of the process, the rate at which he operator is working with respect to a standard rate. Each of the switches B1, C1,..., corresponds to a predetermined rate of working, and the work study engineer closes the appropriate switch.

At any time during the operation, the work study engineer may decide that his original assessment of the rate of working of the operator was incorrect, and make another selection.

At the end of the first operation (and the beginning of the second operation), the work study engineer again operates the pushbutton timing switch 14. In a sequence of events identical to those described hereinbefore, pulses from the 10 c.p.s. pulse generator 18 enter the counter 42 and simultaneously open the NAND gate 52. Pulses from the 5 k.c.p.s. pulse generator 55 enter the recording equipment during each positive half cycle of the 10 c.p.s. pulses until a count corresponding to the last selected switch among the switches A1, B1, C1,..., is accumulated by the counter 42. The output signal from the counter 42 then resets the bistable circuits 30 and 22 as hereinbefore described.

The above sequence is repeated during each operation of the process being studied. At any time during the process, the work study engineer may record a spoken commentary via the microphone 56, the filter 58 being provided to ensure that no spurious 5 k.c.p.s. pulses may enter the recording equipment via the microphone.

The signal recorded by the recording equipment thus comprises a spoken commentary and a series of groups of up to 14 "bursts" of 5 k.c.p.s. pulses, the beginning of each "burst" in a given group being indicative of the commencement of an operation and the termination of the immediately preceding operation of the process and the number of "bursts" in a given group being indicative of the rate of working of the operator during the operation of the process immediately preceding the group of bursts.

The arrangement of the bistable circuits 22, 30 and the NAND gate 26 ensures that the operation of the recording circuit 10 is unaffected by erratic operation (or "bounce") of the pushbutton timing switch 14.

Figure 2:
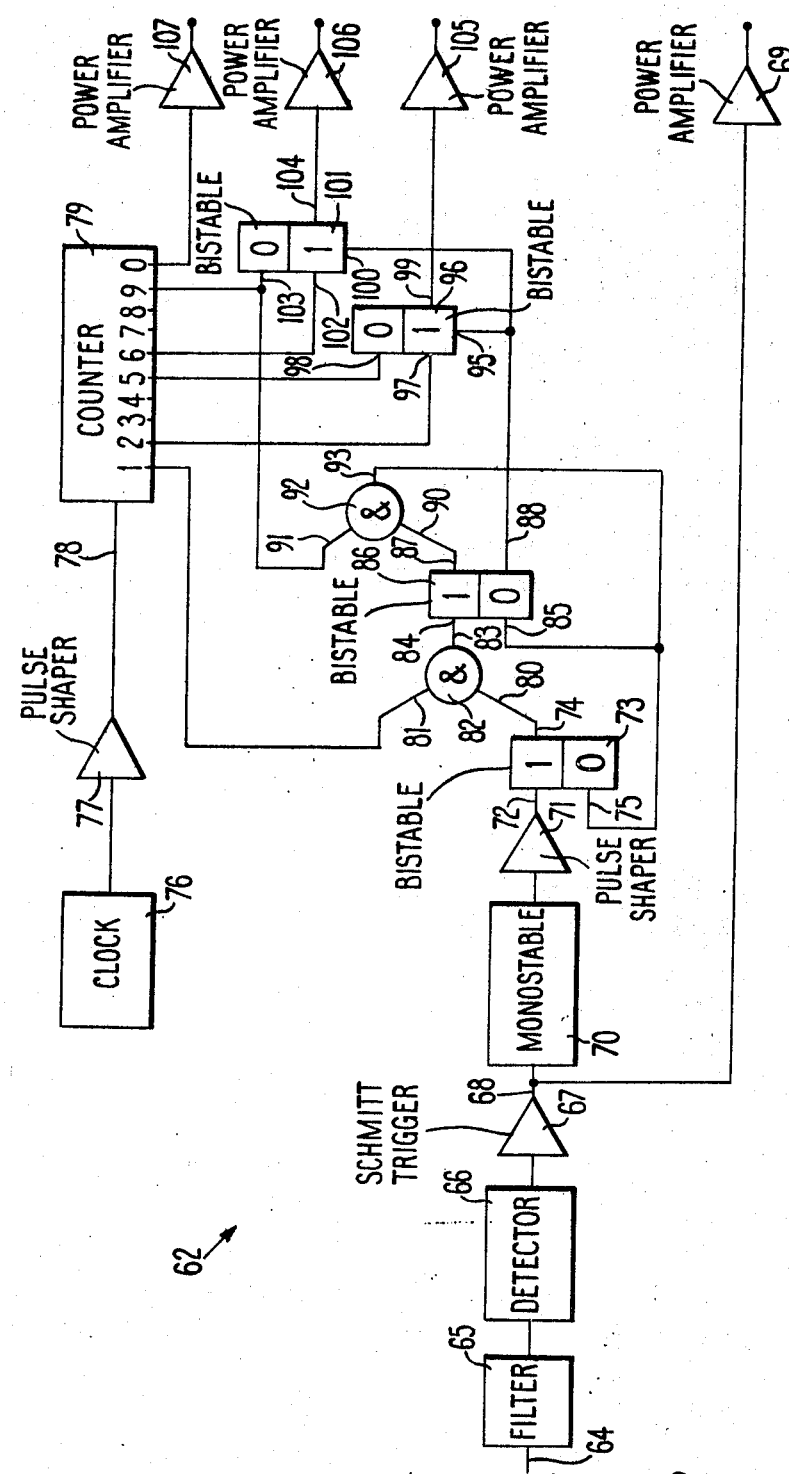
FIG. 2 is a block circuit diagram of a replay circuit for use in a work study recording system in accordance with the invention.

In FIG. 2 there is shown a replay circuit 62 having an input 64 which is connected to receive recorded signals from the recording equipment. Connected in series with the input 64 is a filter 65 which transmits only those signals having a frequency in the region of 5 k.c.p.s., the filter 65 being followed by a detector 66 and a Schmitt trigger circuit 67 having an output 68.

The output 68 of the Schmitt trigger 67 is connected, via a power amplifier 69, to a counter (the "rate" counter, not shown), and, via a monostable circuit 70 and a pulse shaping amplifier 71 in series, to the 1 input 72 of a bistable circuit 73.

A clock pulse generator 76, which has a frequency stability of better than 1 percent and which may advantageously be a Wien bridge oscillator circuit, is connected via a pulse shaping amplifier 77 to an input 78 of a counter 79. The counter 79 includes a binary-to-decimal converter (not shown) and has 10 outputs 1, 2, 3... 9, 0, which are adapted to be sequentially energized The 1 output 74 of the bistable circuit 73 is connected to one input 80 of a two-input AND gate 82, the other input 81 of which is connected to the output 1 of the counter 79. The AND gate 82 has an output 83 which is connected to the 1 input 84 of a bistable circuit 86. The 1 output 87 of the bistable circuit 86 is connected to one input 90 of a two-input AND gate 92, the other input 91 of which is connected to the output 9 of the counter 79. The AND gate 92 has an output 93 which is connected to the respective 0 inputs 75, 85 of the bistable circuits 73, 86.

The 0 output 88 of the bistable circuit 86 is connected to enabling inputs 95, 100 of bistable circuits 96, 101 respectively. The 1 input 97 and the 0 input 98 of the bistable circuit 96 are respectively connected to the output 2 and the output 5 of the counter 79, while the 1 input 102 and the 0 input 103 of the bistable circuit 101 are respectively connected to the output 6 and the output 9 of the counter 79.

The 1 output 99 of the bistable circuit 96 is connected via a power amplifier 105 to printer driving circuitry (not shown), while the 0 output 104 of the bistable circuit 101 is connected via a power amplifier 106 to a printer reset circuitry (not shown). The output 0 of the counter 79 is connected, via a power amplifier 107, to a counter (the "timing" counter, not shown).

In operation the recorded signal from the recording equipment enters the replay circuit 62 at 64, only those signals having a frequency in the region of 5 k.c.p.s. being transmitted by the filter 65. The signal received by the detector 66 is thus composed of a series of groups of bursts of 5 k.c.p.s. pulses as hereinbefore described, which signal is rectified by the detector 66 and applied to the Schmitt trigger 67. At the output 68 of the Schmitt trigger 67 there thus appears a signal comprising a series of trains of 10-cycle pulses, the leading edge of the first pulse in a given train being indicative of the commencement of an operation and the termination of the immediately preceding operation of the process and the number of pulses in a given train being indicative of the rate of working of the operator during the operation of the process immediately preceding the train of pulses. The filter 65, the detector 66 and the Schmitt trigger 67 thus act as a demodulating circuit.

At the end of that part of the recorded signal representative of a given operation of the process, therefore, there appears at the output 68 of the Schmitt trigger 67 a train of up to fourteen 10-c.p.s. pulses, which train of pulses is amplified in the power amplifier 69. The number of pulses in the train is counted by the rate counter while the leading edge of the first pulse in the train triggers the monostable circuit 70. The time constant of the monostable circuit 70 is adjusted to be greater than the maximum duration of a train of pulses from the recording equipment, which in this embodiment of the invention is about 1½ seconds. Thus after a time sufficient for all the pulses in the train to be counted, an output from the monostable circuit 70 triggers the bistable 73 into its 1 state via the pulse shaping amplifier 71, thereby opening AND gate 82.

The clock pulse generator 76 is adjusted to produce an output pulse every 60 msec. and these output pulses drive the counter 79 via the pulse shaping amplifier 77. The outputs 1, 2...9, 0, of the counter 79 are therefore energized sequentially at 60-msec. intervals by the binary-to-decimal converter in the counter 79, while each time the output 0 of the counter 79 is energized i.e. every 100th of a minute, the timing counter is operated.

The first time the 1 output of the counter 79 is energized after AND gate 82 has been opened, the bistable circuit 86 is triggered into its 1 state, thereby opening AND gate 92 and enabling the bistable circuits 96 and 101.

The bistable circuit 96 is triggered into its 1 state by the immediately subsequent energization of the output 2 of the counter 79 and triggered back into its 0 state by the next subsequent energization of the output 5, while the bistable circuit 101 is triggered into its 1 state by the next subsequent energization of the output 6 of the counter 79 and triggered back into its 0 state by the next subsequent energization of the output 9, which also simultaneously triggers the bistable circuits 73 and 86 back into their 0 states via the AND gate 92, thus resetting the bistable circuits 73, 86 and the AND gates 82, 92 to their original conditions.

The signal at the output 99 of the bistable circuit 96 is thus a positive-going pulse of 180 msec. duration, which pulse is amplified in the power amplifier 105 and causes the printer to print out the totals accumulated in the rate counter and the timing counter. Similarly, the signal at the output 104 of the bistable circuit 101 is a positive going pulse of 180 msec. duration occurring 60 msec. after the termination of the pulse at the output 99 of the bistable circuit 96, which pulse is amplified in the power amplifier 106 and is operative to reset the rate counter and the timing counter to zero.

The output of the printer therefore comprises pairs of numbers at times approximately corresponding to the end of each operation of the process: one figure represents the rate at which the operator was working during the respective operation, while the other figure is the duration of the respective operation.

It will be appreciated that the means whereby coded information may be recorded need not necessarily comprise two pulse generators, the output of one of which modulates the output of the other; a single pulse generator having a higher frequency than the 10 c.p.s. pulse generator 18 could, for example, be used in conjunction with the counter. Similarly, the multivibrator circuits constituting the pulse generators 18 and 55 may be replaced by any other suitable pulse generators such as, for example, LC or RC oscillators connected to drive Schmitt triggers.

It will also be appreciated that the Wien bridge oscillator circuit constituting the clock pulse generator 76 may be replaced by any other suitable pulse generator having good frequency stability such as, for example, a crystal-controlled oscillator circuit. Also, the timing of the operation of the printer may be controlled independently of the clock pulse generator 76, for example by means of a number of monostable circuits of suitable time constant triggered from the monostable circuit 70.

As further additions, it would be possible to provide a further button which, when operated, impressed on the tape information adapted to cause the printer to print a line of zeros, thus clearing the system and providing an easily identifiable break. It would also be possible to arrange that each operation is given an index number which is printed out in a separate column.

We claim:

1. A work study recording system for analyzing a worker's performance of a production process or like task consisting of a number of operations, said recording system comprising an electrical information generating means electrically connected to a recording means, said electrical information generating means comprising:

means for converting spoken information in the form of sound pressure waves to an electrical signal and for communicating same to said recording means, means for generating and communicating to said recording means electrical timing signals corresponding to the commencement and termination of each said operation in said process, and manually operable means for generating and communicating further coded information in the form of electrical signals to said recording means, said means for generating and communicating electrical timing signals and said manually operable means comprising;

a first pulse generator, a second pulse generator having the electrical output thereof connected to said first pulse generator, a first counter connected to the output of said first pulse generator, and said second pulse generator being connected to said first pulse generator for modulating the pulses from said first pulse generator until a predetermined number of pulses from said first pulse generator have been counted by said first counter, said predetermined number of pulses from said first pulse generator being representative of said further coded information.

2. The recording system defined in claim 1 comprising in addition a replay circuit connected to said recording means for receiving electrical signals therefrom, said replay circuit including means for measuring the intervals between successive timing signals and a printing means connected to receive signals from said replay circuit for printing the duration of each said interval and said further coded information.

3. The recording system defined in claim 1 wherein said first pulse generator and said second pulse generator are multivibrator circuits.

4. The recording system defined in claim 2 wherein said replay circuit includes means for demodulating said modulated pulses from said first pulse generator and a second counter connected to receive and count said demodulated pulses.

5. The recording system defined in claim 4 wherein said means for demodulating comprises a filter to transmit only those recorded signals having a frequency in the region of the frequency of the pulses from said second pulse generator, a rectifying circuit connected to receive and rectify the filtered signal from said filter and a Schmitt trigger circuit connected to receive the rectified signal from said rectifying circuit.

6. The recording system defined in claim 4 wherein said replay circuit further includes a clock pulse generator, a third counter connected to be driven by said clock pulse generator and having a plurality of outputs which are to be cyclically energized, and a fourth counter connected to be driven by one of said outputs of said third counter and to be reset to zero in response to successive timing signals.

7. A recording system defined in claim 6 wherein said clock pulse generator comprises a Wien bridge oscillator circuit.

8. The recording system defined in claim 6 wherein said cyclically energized outputs of said third counter produce, in response to each said timing signal, a first control signal which is operative to cause said printing device to print the totals accumulated in said second and fourth counters and a second control signal which is operative to reset said second and fourth counters.